US008035973B2

(12) United States Patent
McColloch

(10) Patent No.: US 8,035,973 B2
(45) Date of Patent: Oct. 11, 2011

(54) CAGE HAVING A HEAT SINK DEVICE SECURED THERETO IN A FLOATING ARRANGEMENT THAT ENSURES THAT CONTINUOUS CONTACT IS MAINTAINED BETWEEN THE HEAT SINK DEVICE AND A PARALLEL OPTICAL COMMUNICATIONS DEVICE SECURED TO THE CAGE

(75) Inventor: Laurence R. McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 148 days.

(21) Appl. No.: 12/551,492

(22) Filed: Aug. 31, 2009

(65) Prior Publication Data

US 2011/0051373 A1  Mar. 3, 2011

(51) Int. Cl.
*H05K 7/20* (2006.01)
*H04B 10/02* (2006.01)

(52) U.S. Cl. ........ 361/709; 361/704; 361/707; 361/710; 361/714; 361/715; 398/117; 398/164

(58) Field of Classification Search .................. 361/704, 361/707, 709, 710, 714, 715; 385/92; 372/36; 353/57; 362/294, 345, 373, 580, 547, 218, 362/264; 398/117, 164
See application file for complete search history.

(56) References Cited

U.S. PATENT DOCUMENTS

| 6,600,611 | B2* | 7/2003 | Inujima et al. ................. 359/808 |
|---|---|---|---|
| 6,816,376 | B2* | 11/2004 | Bright et al. .................. 361/704 |
| 6,893,293 | B2* | 5/2005 | Ice et al. .................... 439/607.2 |
| 6,916,122 | B2* | 7/2005 | Branch et al. .................... 385/92 |
| 6,922,516 | B2* | 7/2005 | Kurashima et al. ........... 385/134 |
| 6,935,882 | B2* | 8/2005 | Hanley et al. ................. 439/372 |
| 6,940,723 | B2* | 9/2005 | Ice et al. ..................... 361/709 |
| 6,986,679 | B1 | 1/2006 | Aronson et al. |
| 7,048,452 | B2* | 5/2006 | Malagrino, Jr. ................. 385/92 |
| 7,131,859 | B1 | 11/2006 | Zumbrunnen et al. |
| 7,178,996 | B2* | 2/2007 | Malagrino et al. .............. 385/92 |
| 7,193,851 | B2 | 3/2007 | Yatskov |
| 7,195,403 | B2* | 3/2007 | Oki et al. ........................ 385/92 |
| 7,317,617 | B2* | 1/2008 | Meadowcroft et al. ....... 361/715 |
| 7,322,850 | B2* | 1/2008 | Neer et al. .................... 439/567 |
| 7,371,965 | B2 | 5/2008 | Ice |

(Continued)

FOREIGN PATENT DOCUMENTS

JP  2010085805 A  *  4/2010

(Continued)

OTHER PUBLICATIONS

Molex Next Generation SAS High Density Connector Proposal; mini SAS HD External I/O, Feb. 20, 2009.

*Primary Examiner* — Anatoly Vortman

(57) ABSTRACT

A floating heat sink device is provided that attaches to a cage in a floating configuration that enables the heat sink device to move, or "float", as the parallel optical communications device secured to the cage moves relative to the cage. Because the heat sink device floats with movement of the parallel optical communications device, at least one surface of the parallel optical communications device maintains continuous contact with at least one surface of the heat sink device at all times. Ensuring that these surfaces are maintained in continuous contact at all times ensures that heat produced by the parallel optical communications device will be transferred into and absorbed by the floating heat sink device.

22 Claims, 14 Drawing Sheets

U.S. PATENT DOCUMENTS

| | | | |
|---|---|---|---|
| 7,405,931 B2 | 7/2008 | Saturley et al. | |
| 7,491,090 B2 * | 2/2009 | Oki et al. | 439/607.17 |
| 7,530,835 B2 * | 5/2009 | Yu et al. | 439/372 |
| 7,898,808 B2 * | 3/2011 | Joiner et al. | 361/707 |
| 2003/0002824 A1 * | 1/2003 | Chan et al. | 385/92 |
| 2003/0141090 A1 * | 7/2003 | Kruger et al. | 174/50 |
| 2003/0169983 A1 * | 9/2003 | Branch et al. | 385/92 |
| 2003/0236019 A1 * | 12/2003 | Hanley et al. | 439/372 |
| 2004/0027816 A1 | 2/2004 | Ice | |
| 2004/0101257 A1 * | 5/2004 | Kruger et al. | 385/92 |
| 2004/0203289 A1 * | 10/2004 | Ice et al. | 439/607 |
| 2005/0195565 A1 | 9/2005 | Bright | |
| 2005/0226571 A1 * | 10/2005 | Malagrino et al. | 385/92 |
| 2006/0270275 A1 * | 11/2006 | Morohashi et al. | 439/607 |
| 2006/0274518 A1 * | 12/2006 | Yu et al. | 361/816 |
| 2007/0134003 A1 * | 6/2007 | Lee et al. | 398/164 |
| 2008/0031620 A1 * | 2/2008 | Hudgins et al. | 398/9 |
| 2008/0247762 A1 * | 10/2008 | Yoshikawa et al. | 398/138 |
| 2009/0253290 A1 | 10/2009 | Harris | |

FOREIGN PATENT DOCUMENTS

| | | |
|---|---|---|
| WO | WO 03060583 A1 * | 7/2003 |
| WO | WO-03/077375 | 9/2003 |
| WO | WO-2007/092515 | 8/2007 |

* cited by examiner

US 8,035,973 B2

CAGE HAVING A HEAT SINK DEVICE SECURED THERETO IN A FLOATING ARRANGEMENT THAT ENSURES THAT CONTINUOUS CONTACT IS MAINTAINED BETWEEN THE HEAT SINK DEVICE AND A PARALLEL OPTICAL COMMUNICATIONS DEVICE SECURED TO THE CAGE

TECHNICAL FIELD OF THE INVENTION

The invention relates to heat dissipation in parallel optical communications devices. More particularly, the invention relates to a cage having a heat sink device secured thereto in a floating arrangement that ensures that a portion of a parallel optical communications device secured to the cage is maintained in continuous contact with the heat sink device even if there is some movement of the optical communications device relative to the cage.

BACKGROUND OF THE INVENTION

A parallel optical communications device is a device that has multiple transmit (TX) channels, multiple receive (RX) channels, or both. A parallel optical transceiver device is a parallel optical communications module that has multiple TX channels and multiple RX channels in the TX and RX portions, respectively, of the transceiver device. The TX portion comprises components for transmitting data in the form of modulated optical signals over multiple optical waveguides, which are typically optical fibers. The TX portion includes a laser driver circuit and a plurality of laser diodes. The laser driver circuit outputs electrical signals to the laser diodes to modulate them. When the laser diodes are modulated, they output optical signals that have power levels corresponding to logic 1s and logic 0s. An optics system of the transceiver module focuses the optical signals produced by the laser diodes into the ends of respective transmit optical fibers held within a connector that mates with the transceiver module.

The RX portion includes a plurality of receive photodiodes that receive incoming optical signals output from the ends of respective receive optical fibers held in the connector. The optics system of the transceiver module focuses the light that is output from the ends of the receive optical fibers onto the respective receive photodiodes. The receive photodiodes convert the incoming optical signals into electrical analog signals. An electrical detection circuit, such as a transimpedance amplifier (TIA), receives the electrical signals produced by the receive photodiodes and outputs corresponding amplified electrical signals, which are processed in the RX portion to recover the data.

Many parallel optical communications devices are configured to be inserted into an opening of a cage. The cage is typically mounted to an upper surface of a printed circuit board (PCB). The PBC typically has one or more integrated circuits (ICs) and other electrical components mounted on it. One of the ICs mounted on the PCB is typically a controller IC that is electrically interconnected by electrically conductive traces on the PCB to electrical contacts on the parallel optical communications device. In this way, the controller mounted on the PCB and the electronics of the optical communications device are able to communicate with one another. Often times, multiple cages are mounted in receptacles formed in a front panel of a rack, with each of the cages having a respective parallel optical communications device secured thereto. This type of mounting configuration is commonly referred to as an edge mounting configuration.

There is an ever-increasing demand in the optical communications industry for optical communications devices that are capable of simultaneously transmitting and/or receiving ever-increasing amounts of data. As the bandwidths of optical communications devices increase, the amount of heat that is produced by the electronics of the devices also increases. Therefore, in such devices, heat dissipation systems, commonly made up of one or more heat sink devices, are needed to dissipate the relatively large amounts of heat produced by the parallel optical communications devices. For example, one known type of parallel optical transceiver device is a two-by-twelve optical transceiver device having twelve transmit channels and twelve receive channels, with each transmit channel and each receive channel transmitting and receiving data, respectively, at a rate of about 10 Gigabits per second (Gb/s). This type of parallel optical communications device produces a relatively large amount of heat (e.g., 5 watts). In order to prevent the heat produced by these devices from degrading the performance of the devices, heat dissipation systems are needed.

FIG. 1 illustrates a perspective view of a cage 2 that is manufactured by a company called Molex Incorporated of Lisle, Ill. The cage 2 is generally rectangular in shape and has a cage housing 3 that has a length, L, a width, W, and a height, H. A receptacle 4 is formed in the cage housing 3. The receptacle 4 is configured to mate with a two-by-twelve optical transceiver device (not shown) of the aforementioned type, which is sometimes referred to in the industry as a CXP optical transceiver device. The cage housing 3 is made of a metal material and is designed to interconnect with an electrical cable having copper contacts and copper wiring. Because the copper wiring and contacts are thermally conductive, some of the heat produced by the electrical circuitry of the parallel optical transceiver device is transferred into the copper wiring and contacts and is dissipated therein and in the jacket of the cable. In addition, the cage 2 has openings 6 formed in a metal lid 5 that dissipate some of the heat transferred into the housing 3. The cage 2 does not include any heat sink devices and no other provisions for dissipating heat are provided.

For parallel optical transceiver devices of the type described above that have large numbers of channels (e.g., twelve transmit channels and twelve receive channels), the heat dissipation characteristics of the cage 2 are inadequate for dissipating the relatively large amounts of heat that can be produced by the electrical circuitry of the parallel optical transceiver devices. Accordingly, a need exists for a heat sink device for use in combination with a cage that is adequate for dissipating relatively large amounts of heat produced by a parallel optical communications device secured to the cage.

SUMMARY OF THE INVENTION

The invention is directed to a cage having at least one floating heat sink device and methods for dissipating heat in a cage. The cage is configured for use with at least one parallel optical communications device. The cage comprises a cage housing, a first floating heat sink device, and a spring clip. The cage housing has at least a front side, a back side, a top side, a bottom side, a left side and a right side, each of the top side, the bottom side, the left side and the right side having first ends that intersect with the front side and second ends that intersect with the back side. The cage housing has at least a first receptacle formed in the front side thereof configured to engage a first parallel optical communications device. The first floating heat sink device has at least an upper surface and a lower surface. At least a portion of the lower surface of the first floating heat sink device is positioned against at least a portion of the top side of the cage housing. The lower surface of the first floating heat sink device includes a heat transfer surface that is disposed in an opening in the top side of the cage housing. The spring clip is secured to the cage housing such that a portion of the spring clip is in contact with a portion of the upper surface of the first floating heat sink device. The spring clip retains the portion of the lower surface of the first floating heat sink device in position against the portion of the top side of the cage housing while allowing at least the heat transfer surface of the first floating heat sink device to move relative to the cage housing. If a first parallel optical communications device is connected to the receptacle of the cage housing, one or more forces exerted by the spring clip act to maintain a heat transfer surface of the first parallel optical communications device in continuous contact with the heat transfer surface of the first floating heat sink device.

In accordance with another embodiment, the cage comprises a cage housing that has at least first and second receptacles formed in the front side thereof configured to engage first and second parallel optical communications devices, respectively. The first receptacle is located below the second receptacle such that the first receptacle is closer to the bottom side of the cage housing than to the top side of the cage housing and such that the second receptacle is closer to the top side of the cage housing than to the bottom side of the cage housing. A first floating heat sink device of the cage has at least an upper surface and a lower surface. At least a portion of the upper surface of the first floating heat sink device is positioned against at least a portion of the bottom side of the cage housing. The upper surface of the first floating heat sink device includes a heat transfer surface that is disposed in an opening in the bottom side of the cage housing. The cage has a spring coupling mechanism that is secured to the cage housing and to a blade on which the cage is mounted such that a portion of the spring coupling mechanism is in contact with a portion of the lower surface of the first floating heat sink device. The spring coupling mechanism retains the portion of the upper surface of the first floating heat sink device in position against the portion of the bottom side of the cage housing while allowing at least the heat transfer surface of the first floating heat sink device to move relative to the cage housing. If a first parallel optical communications device is connected to the first receptacle of the cage housing, one or more forces exerted by the spring coupling mechanism act to maintain a heat transfer surface of the first parallel optical communications device in continuous contact with the heat transfer surface of the first floating heat sink device.

The method comprises providing a cage housing, providing a first floating heat sink device, positioning the first floating heat sink device on the cage housing, and securing a spring clip to the cage housing. The cage housing has at least a front side, a back side, a top side, a bottom side, a left side and a right side. Each of the top side, the bottom side, the left side and the right side has first ends that intersect with the front side and second ends that intersect with the back side. The cage housing has at least a first receptacle formed in the front side that is configured to engage a first parallel optical communications device. The first floating heat sink device is positioned on the cage housing such that at least a portion of the lower surface of the first floating heat sink device is positioned against at least a portion of the top side of the cage housing. The lower surface of the first floating heat sink device includes a heat transfer surface that is disposed in an opening in the top side of the cage housing. The spring clip is secured to the cage housing such that a portion of the spring clip is in contact with a portion of the upper surface of the first floating heat sink device. The spring clip retains the portion of the lower surface of the first floating heat sink device in position against the portion of the top side of the cage housing while allowing at least the heat transfer surface of the first floating heat sink device to move relative to the cage housing. If a first parallel optical communications device is connected to the receptacle of the cage housing, one or more forces exerted by the spring clip act to maintain a heat transfer surface of the first parallel optical communications device in continuous contact with the heat transfer surface of the first floating heat sink device.

In accordance with another embodiment, the method comprises providing a cage housing, providing a first floating heat sink device, positioning the first floating heat sink device on the cage housing, and securing a spring coupling mechanism to the cage housing and to a blade on which the cage is mounted. The cage housing has at least a front side, a back side, a top side, a bottom side, a left side and a right side. Each of the top side, the bottom side, the left side and the right side have first ends that intersect with the front side and second ends that intersect with the back side. The cage housing has at least first and second receptacles formed in the front side thereof configured to engage first and second parallel optical communications devices, respectively. The first receptacle is below the second receptacle such that the first receptacle is closer to the bottom side of the cage housing than to the top side of the cage housing and such that the second receptacle is closer to the top side of the cage housing than to the bottom side of the cage housing. The first floating heat sink device has at least an upper surface and a lower surface. The first floating heat sink device is positioned on the cage housing such that at least a portion of the upper surface of the first floating heat sink device is positioned against at least a portion of the bottom side of the cage housing. The upper surface of the first floating heat sink device includes a heat transfer surface that is disposed in an opening in the bottom side of the cage housing. The spring coupling mechanism is secured to the cage housing and to a blade on which the cage is mounted such that a portion of the spring coupling mechanism is in contact with a portion of the lower surface of the first floating heat sink device. The spring coupling mechanism retains the portion of the upper surface of the first floating heat sink device in position against the portion of the bottom side of the cage housing while allowing at least the heat transfer surface of the first floating heat sink device to move relative to the cage housing. If a first parallel optical communications device is connected to the first receptacle of the cage housing, one or more forces exerted by the spring coupling mechanism act to maintain a heat transfer surface of the first parallel optical communications device in continuous contact with the heat transfer surface of the first floating heat sink device.

These and other features and advantages of the invention will become apparent from the following description, drawings and claims.

DETAILED DESCRIPTION OF AN ILLUSTRATIVE EMBODIMENT

In accordance with the invention, a floating heat sink device is provided that attaches to a cage in a floating configuration that enables the heat sink device to move, or "float", as the parallel optical communications device secured to the cage moves relative to the cage. Because the heat sink device floats with movement of the parallel optical communications device, at least one surface of the parallel optical communications device maintains continuous contact with at least one surface of the heat sink device at all times. Ensuring that these surfaces are maintained in continuous contact at all times ensures that heat produced by the parallel optical communications device will be transferred into and absorbed by the floating heat sink device.

Figure 1:
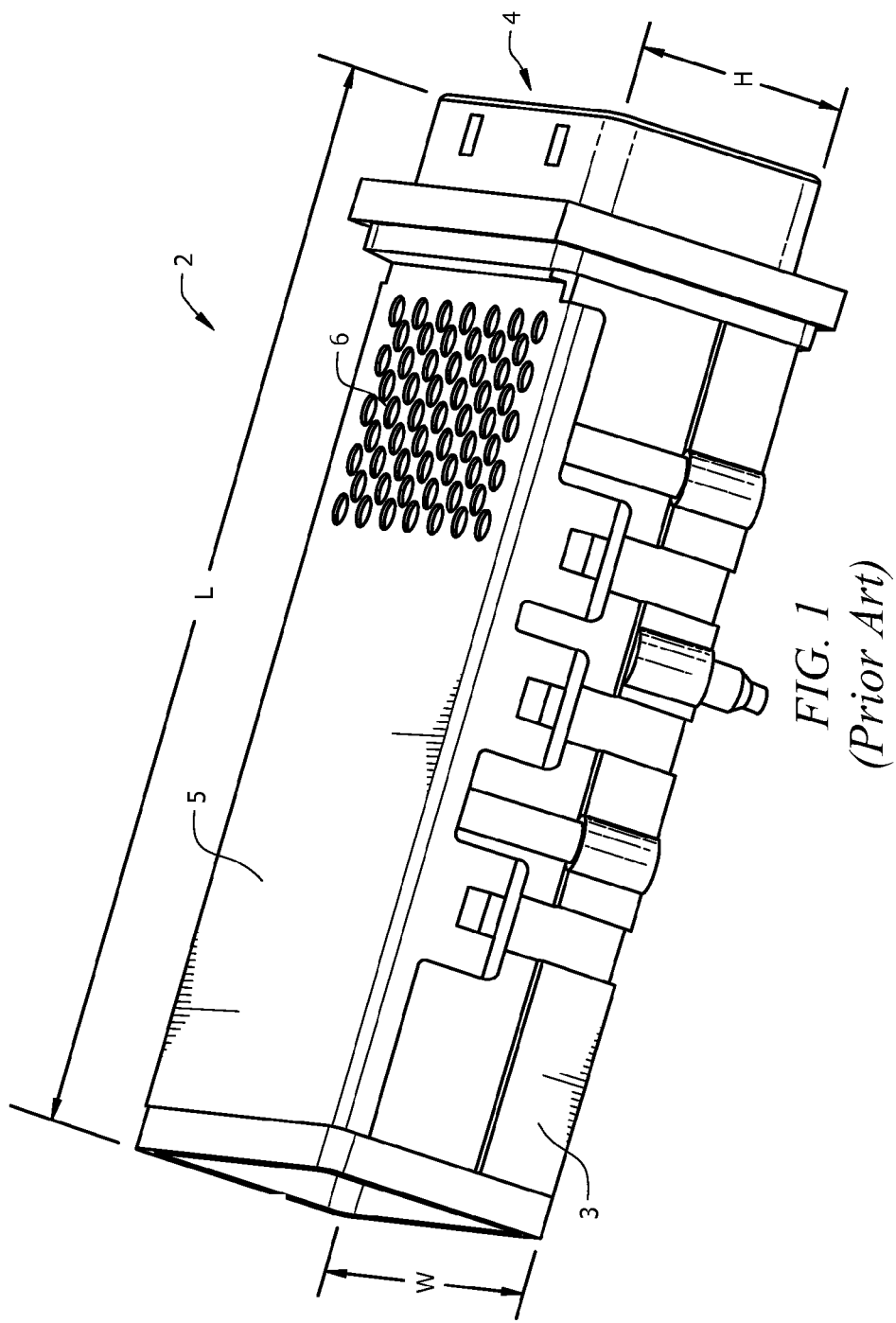
FIG. 1 illustrates a top perspective view of a known cage that is configured to be connected to a parallel optical communications device.
Figure 2:
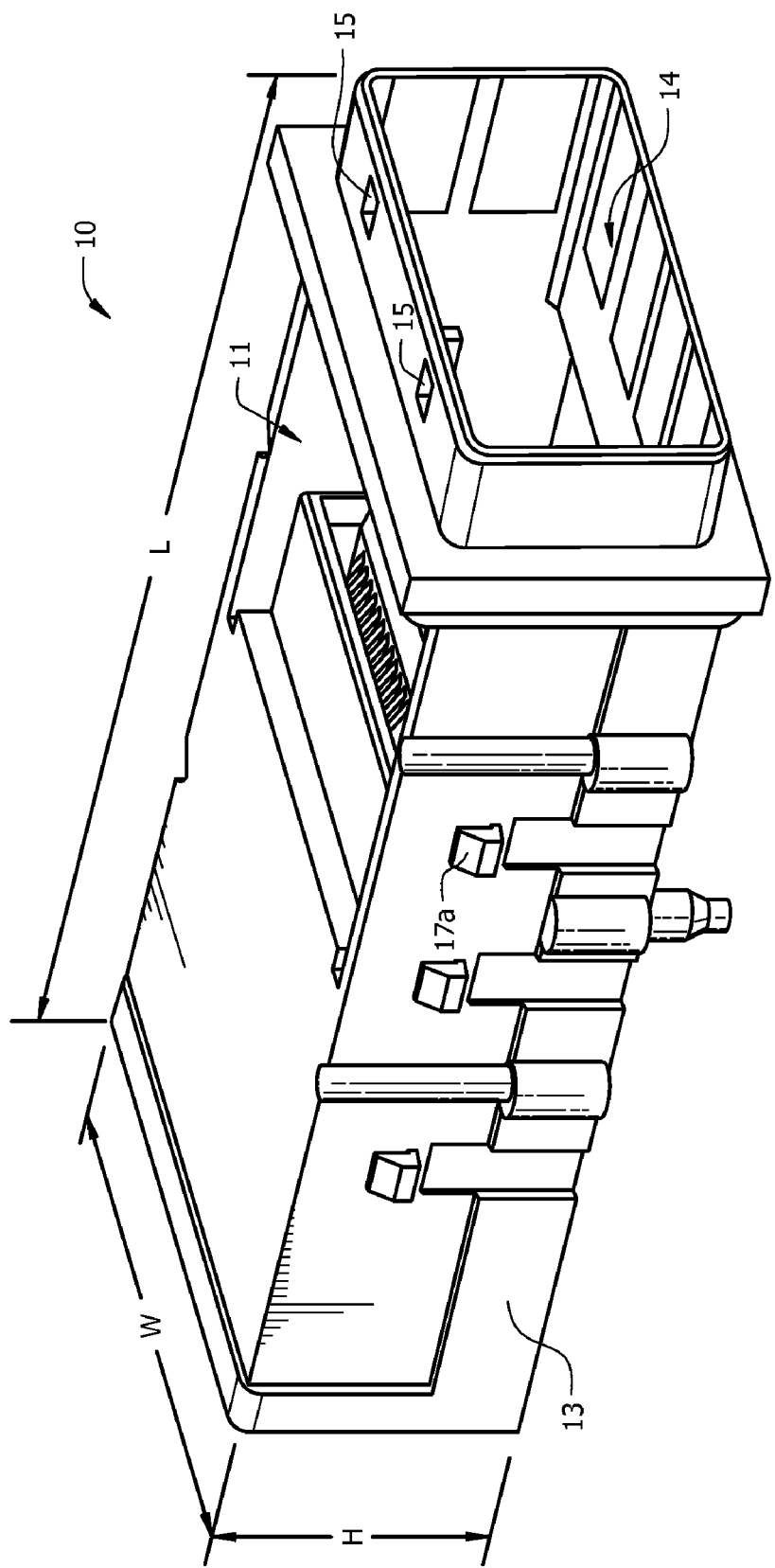
FIG. 2 illustrates the cage shown in FIG. 1 after the cage has been modified in accordance with an illustrative embodiment to be secured to a heat sink device.

FIG. 2 illustrates a cage 10 that has been modified in accordance with an illustrative embodiment to be secured to a heat sink device. The modified cage 10 shown in FIG. 2 is identical to the cage 2 shown in FIG. 1 with the exception that the lid 5 shown in FIG. 1 has been removed to leave an open area 11 that extends over a large portion of the length, L, and width, W, of the modified cage 10. The length, L, width, W, and height, H, of the modified cage 10 are identical to the length, L, width, W, and height, H, respectively, of the cage 2 shown in FIG. 1. Like the cage 2 shown in FIG. 1, the modified cage 10 has a cage housing 13 and a receptacle 14. The receptacle 14 is configured to mate with a parallel optical communications device (not shown).

As will be described below in detail with reference to FIGS. 3-9, when a parallel optical communications device is connected to the receptacle 14 of the modified cage 10, a heat transfer surface of the parallel optical communications device is positioned within a portion of the open area 11 of the modified cage 10. Similarly, when the heat sink device is secured to the modified cage 10, a heat transfer surface of the heat sink device is positioned within the same portion of the open area 11. Consequently, the heat transfer surface of the heat sink device and the heat transfer surface of the parallel optical communications device abut and are in continuous contact with each other. Due to the aforementioned floating arrangement of the heat sink device, when the heat sink device is coupled to the modified cage 10, the respective surfaces are maintained in continuous contact with each other even if the parallel optical communications device moves relative to the modified cage 10.

Figure 3:
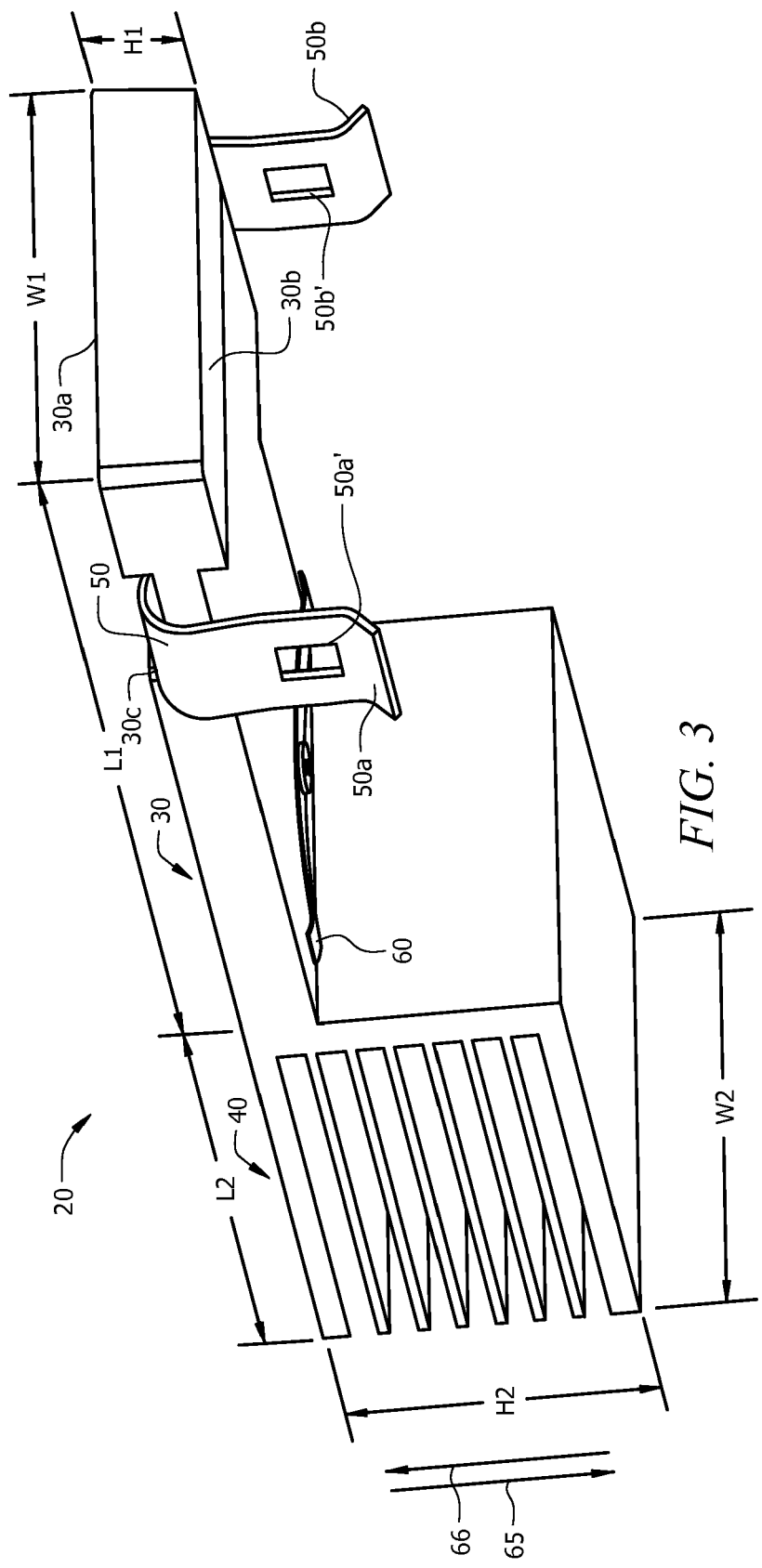
FIG. 3 illustrates a perspective view of the heat sink device in accordance with an illustrative embodiment, which is configured to be secured to the modified cage shown in FIG. 2.

FIG. 3 illustrates a perspective view of the heat sink device 20 in accordance with an illustrative embodiment, which is configured to be secured to the modified cage 10 shown in FIG. 2 in the open area 11 of the modified cage 10. In accordance with this embodiment, the floating heat sink device 20 has a heat transfer portion 30 for transferring heat through the floating heat sink device 20 and a heat dissipation portion 40 for dissipating heat transferred from the heat transfer portion 30 into the heat dissipation portion 40. The heat transfer portion 30 has a length, L1, a width, W1, and a height, H1. The length L1 and the width W1 are approximately equal to the length L and width W, respectively, of the modified cage 10 shown in FIG. 2, which are approximately equal to the length and width, respectively, of the open area 11 shown in FIG. 2. The heat dissipation portion 40 has a length L2, a width, W2, and a height, H2. The width W2 and the height H2 are approximately equal to the width W and height H, respectively, of the modified cage 10 shown in FIG. 2.

The heat transfer portion 30 has a spring clip 50 secured to an upper surface 30a thereof and a balancing spring 60 secured to a lower surface 30b thereof. The spring clip 50 and the balancing spring 60 are both symmetrical relative to the width WI of the heat transfer portion 30. The balancing clip 60 is secured to the lower surface 30b of the heat transfer portion 30 via, for example, a rivet (not shown). The spring clip 50 is seated within a groove 30c formed in the upper surface 30a of the heat transfer portion 30. Interlocking portions 50a and 50b of the spring clip 50 have openings 50a' and 50b', respectively, formed therein that are sized and shaped to mate with tabs 17a and 17b (FIG. 2), respectively, located on opposite sides of the modified cage 10 (FIG. 2). In FIG. 2, only tab 17a is visible. Tab 17b (not shown) is located on the opposite side of the cage housing 13 from tab 17a. The tabs 17a and 17b are slightly smaller than the respective openings 50a' and 50b' formed in the spring clip 50.

When the tabs 17a and 17b are seated in the openings 50a' and 50b', respectively, the spring clip 50 is locked to the cage housing 13. Because the spring clip 50 is secured to the heat sink device 50, locking of the spring clip 50 to the cage housing 13 secures the heat sink device 20 to the cage housing 13. However, because of the shape and structure of the spring clip 50, the spring clip 50 has a degree of flexibility that allows the heat sink device 20 to have limited movement when certain forces are applied to the heat transfer portion 30 of the heat sink device 20, as will be described below in detail with reference to FIG. 4. This feature allows the heat sink device 20 to float relative to the modified cage 10, which, in turn, ensures that continuous contact is maintained between the lower surface 30b of the heat transfer portion 30 and a heat transfer surface (not shown) of a parallel optical communications device (not shown) attached to the receptacle 14 of the modified cage 10, as will be described below in more detail.

The shape and size of the heat dissipation portion 40 of the heat sink device 20 causes the heat sink device 20 to have a downward moment in the direction indicated by arrow 65 that could possibly overcome the retention forces provided by the spring clip 50. If this were to happen, it could prevent the lower surface 30b of the heat transfer portion 30 from maintaining continuous contact with the heat transfer surface (not shown) of the parallel optical communications device (not shown) attached to the receptacle 14 of the modified cage 10. The balancing spring 60 prevents this from happening. In essence, when the heat sink device 20 is secured to the modified cage 10 via the spring clip 50, the balancing spring 60, which is located at approximately the intersection of the heat transfer portion 30 and the heat sink portion 40, provides a counter-balancing moment in the direction of arrow 66 that offsets the downward moment represented by arrow 65.

Figure 4:
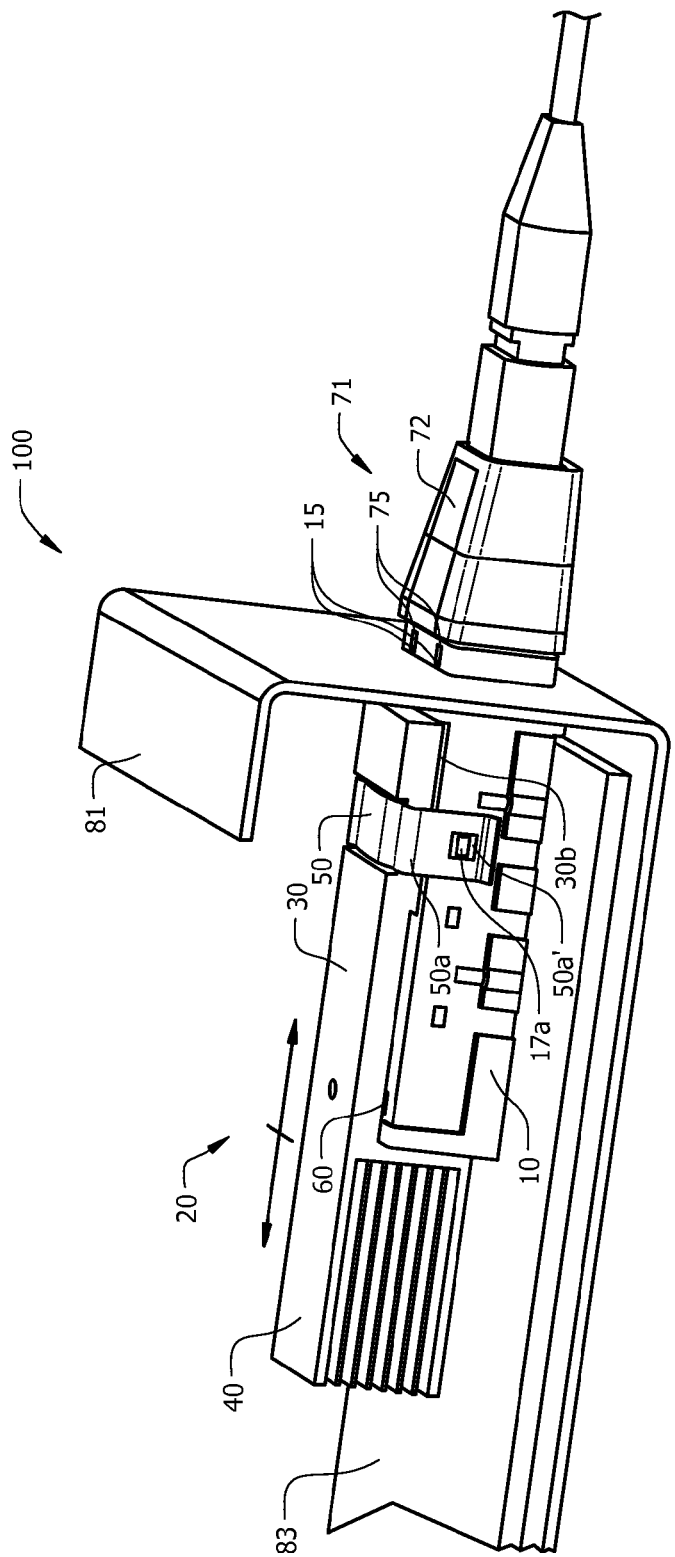
FIG. 4 illustrates a perspective side view of an optical communications system comprising the modified cage shown in FIG. 2 having the heat sink device shown in FIG. 3 secured thereto and having a parallel optical transceiver device connected to the receptacle of the modified cage.

FIG. 4 illustrates a perspective side view of an optical communications system 100 comprising the modified cage 10 shown in FIG. 2 having the heat sink device 20 shown in FIG. 3 secured thereto and having a parallel optical transceiver device 71 connected to the receptacle 14 of the modified cage 10. In FIG. 4, the modified cage 10 is shown secured to a front panel 81 and mounted on a PCB 83. It should be noted that the invention is not limited with respect to the type or configuration of the parallel optical communications device that is used with the modified cage 10. The parallel optical transceiver device 71 is merely one example of a parallel optical communications device that can be used with the modified cage 10. It should also be noted that the invention is not limited to any particular type or configuration of the cage. The modified cage 10 is merely one example of a cage that can be used with the heat sink device 20. In addition, the heat sink device 20 also is not limited to any particular type or configuration, as will be further demonstrated below with reference to FIG. 10.

Figure 5:
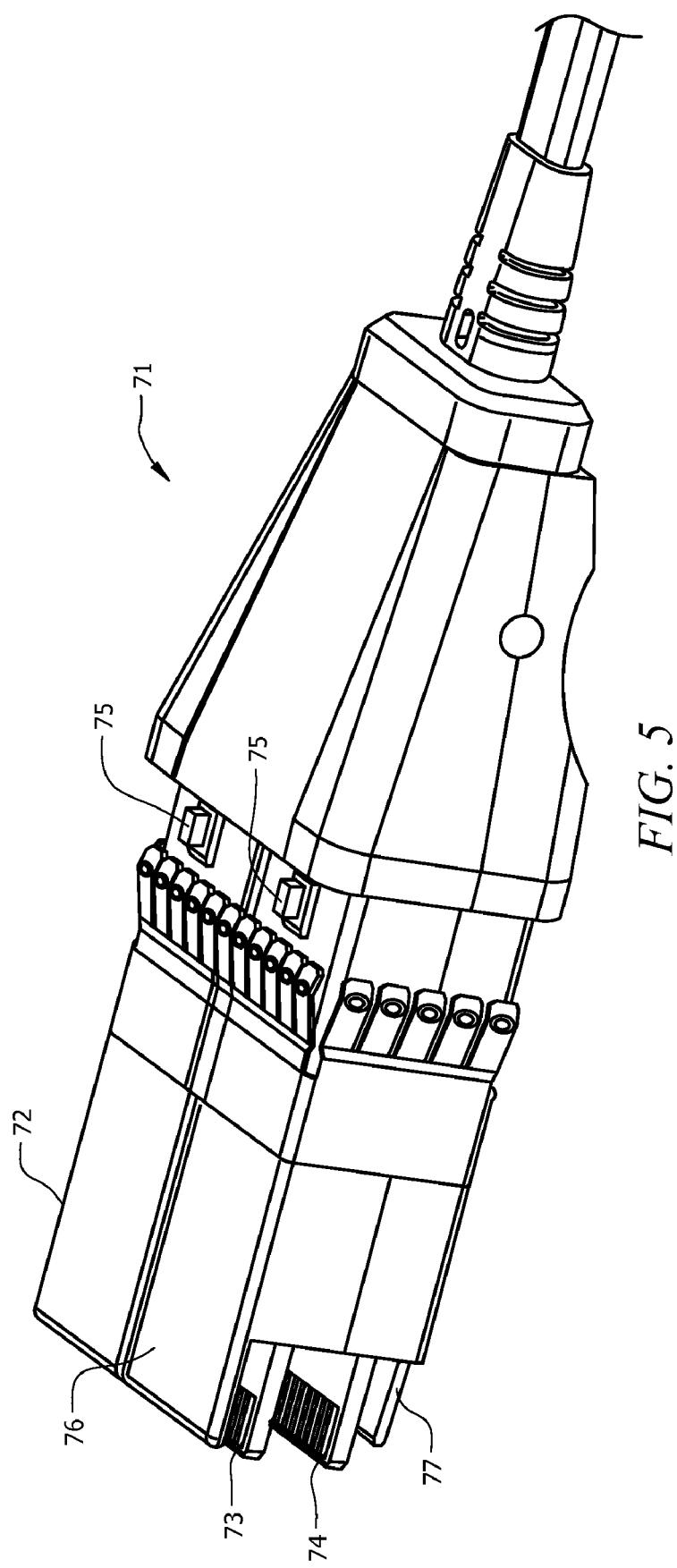
FIG. 5 illustrates a perspective side view of the parallel optical transceiver device shown in FIG. 4.

FIG. 5 illustrates a perspective side view of the parallel optical transceiver device 71 shown in FIG. 4. The parallel optical transceiver device 71 has a housing 72 that houses electrical circuitry and optics (not shown) of the parallel optical transceiver device 71 and first and second rows 73 and 74 of electrical contacts corresponding to the two rows of twelve channels that are contained in the parallel optical transceiver device 71. With reference to FIGS. 4 and 5, when the parallel optical transceiver device 71 is plugged into the receptacle 14 of the modified cage 10, protrusions 75 located on the transceiver device housing 72 are received in respective latch openings 15 formed in the receptacle 14 of the modified cage 10. The protrusions 75 and the respective latch openings 15 together provide a latching mechanism that interlocks the parallel optical transceiver device 71 with the receptacle 14 of the modified cage 10. When the parallel optical transceiver device 71 and the receptacle 14 are locked together via this latching mechanism, the first and second rows 73 and 74 of electrical contacts of the parallel optical transceiver device 71 are received in respective slots (not shown) of an electrical connector (not shown) located inside of the modified cage 10. In this manner, electrical connections are made between the PCB 83 and the parallel optical transceiver device 71.

Figure 6:
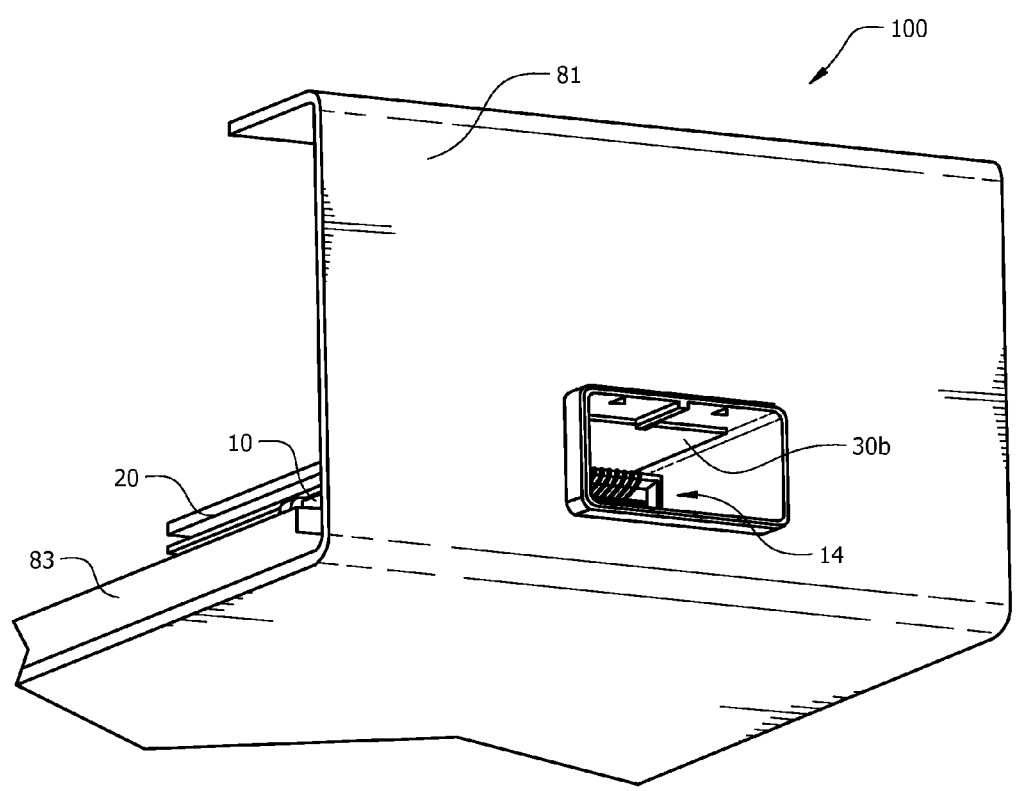
FIG. 6 illustrates a front perspective view of the modified cage shown in FIG. 2 connected to the front panel shown in FIG. 4.

FIG. 6 illustrates a front perspective view of the modified cage 10 connected to the front panel 81 shown in FIG. 4. In FIG. 6, the lower surface 30b of the heat transfer portion 30 of the heat sink device 20 can be seen through the receptacle 14 of the modified cage 10. The lower surface 30b functions as the aforementioned heat transfer surface of the heat sink device 20. When the parallel optical transceiver device 71 and the modified cage 10 are interlocked with each other in the manner described above, an upper heat transfer surface 76 (FIG. 5) of the parallel optical transceiver device 71 (FIG. 5) is in contact with the lower heat transfer surface 30b (FIG. 6) of the heat transfer portion 30 (FIG. 4) of the heat sink device 20 (FIG. 4). The spring clip 50 (FIG. 4) has a spring constant that is selected to ensure that the flats corresponding to these surfaces 30b and 76 are maintained in continuous contact with each other by allowing the heat sink device 20 to move, or float, relative to the modified cage 10. Consequently, if there is some movement of the parallel optical transceiver device 71 within the receptacle 14, the surfaces 30b and 76 will remain in abutment and will move together, thereby ensuring that continuous contact is maintained between the heat transfer surfaces 30b and 76 at all times. This feature ensures that most if not all of the heat that is transferred into the heat transfer surface 76 is transferred into and dissipated by the heat sink device 20.

Figure 7:
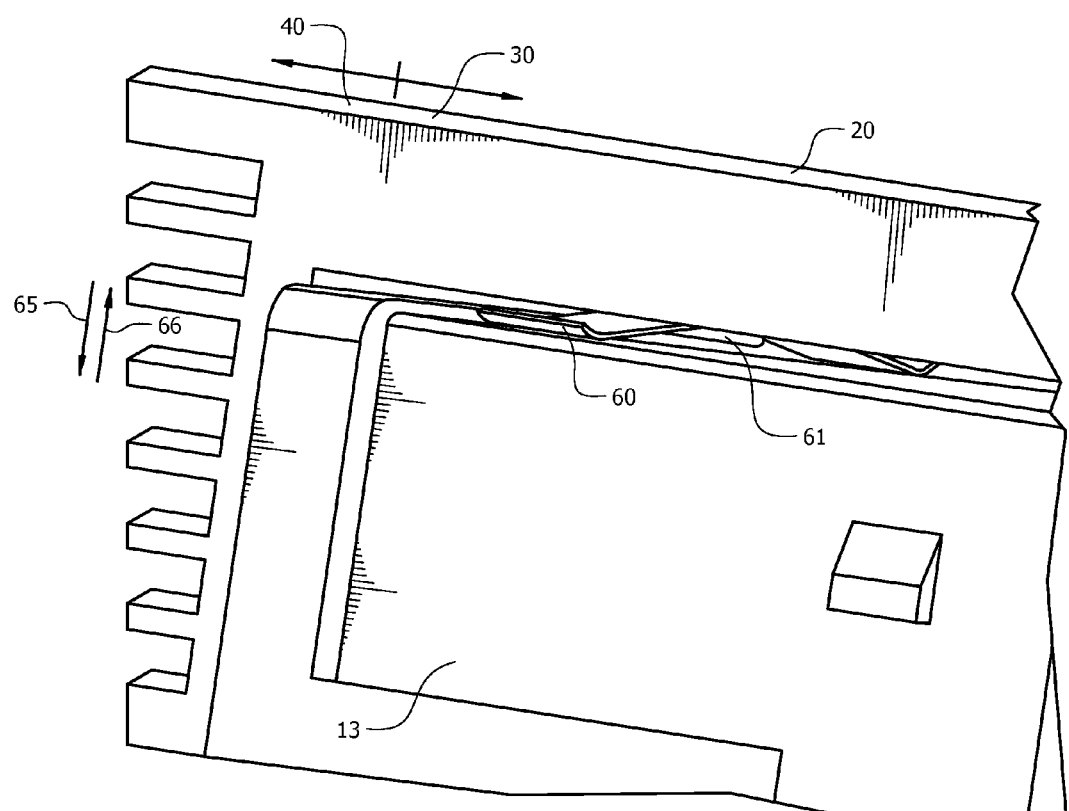
FIG. 7 illustrates an expanded perspective view of a portion of the system shown in FIG. 4.

FIG. 7 illustrates an expanded perspective view of a portion of the system 100 shown in FIG. 4 to more clearly show the balancing spring 60 in contact with the modified cage 10. The spring 60 is attached to the heat sink device 20 by a device 61, which may be, for example, a rivet or the like. As indicated above, the balancing spring 60 is symmetrical relative to the width-dimension of the heat sink device 20. When the system 100 shown in FIG. 4 is assembled, opposite ends of the balancing spring 60 flex against the cage housing 13 creating a moment, which is represented by arrow 66. The moment represented by the arrow 66 is oppositely directed the moment represented by arrow 65 and operates to offset the moment represented by the arrow 65. The spring constants of the balancing spring 60 and of the spring clip 50 are selected to ensure that the forces exerted by the spring clip 50 dominate over those exerted by the balancing spring 60. This ensures that the heat transfer surfaces 30b (FIGS. 4 and 6) and 76 (FIG. 5) remain in continuous contact if the parallel optical transceiver device 71 (FIGS. 4 and 5) moves within the receptacle 14 of the modified cage 10.

Figure 8:
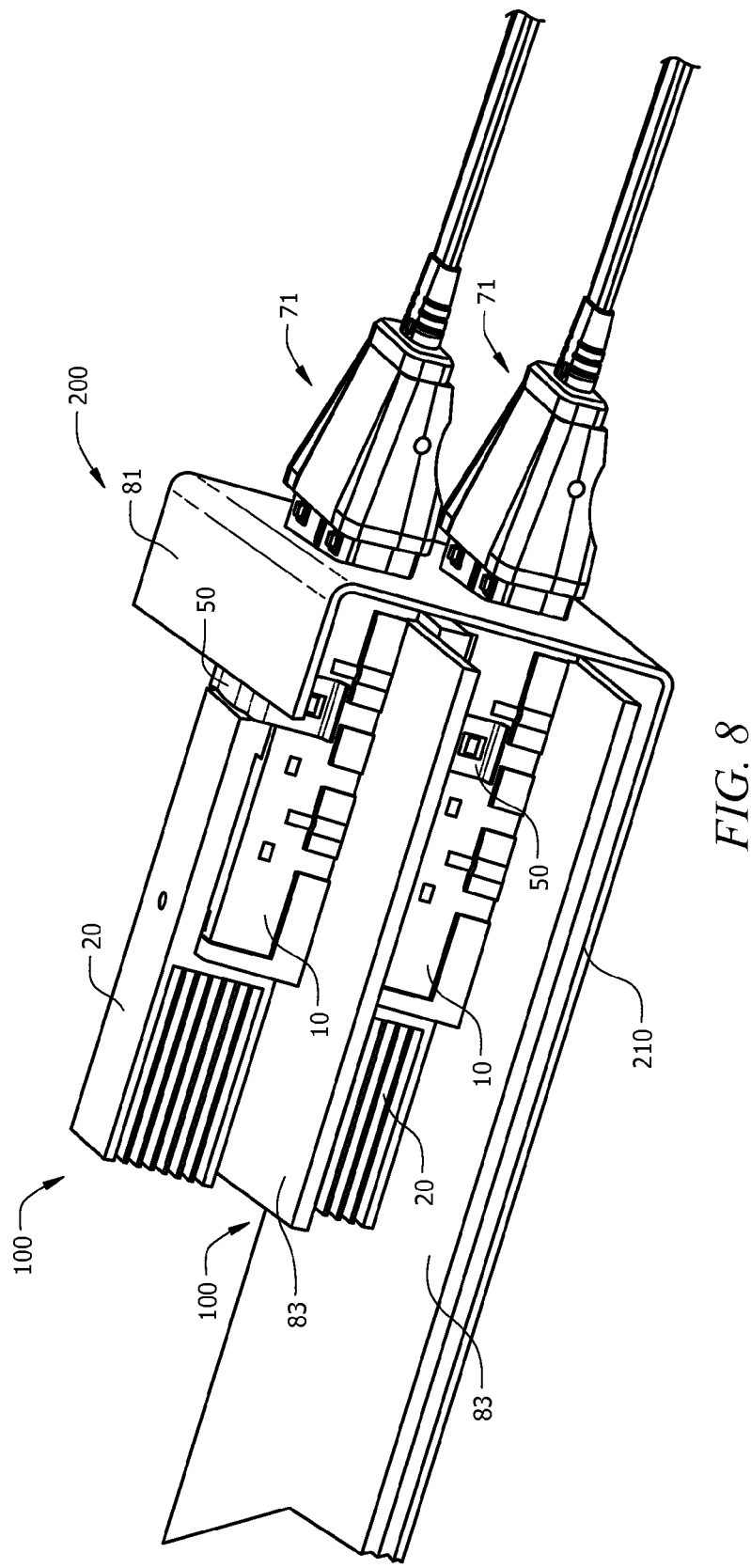
FIG. 8 illustrates a perspective side view of an optical communications system having two of the optical communications systems shown in FIG. 4.

FIG. 8 illustrates a perspective side view of an optical communications system 200 having two of the optical communications systems 100 shown in FIG. 4. Reference numerals in FIG. 8 that are the same are those used in FIG. 4 identify the same components. The system 200 includes two modified cages 10 having respective heat sink devices 20 secured thereto and having respective parallel optical transceiver devices 71 connected to the respective receptacles 14 of the respective modified cages 10. The modified cages 10 are secured to respective openings formed in the front panel 81 and are mounted on respective PCBs 83. Each of the heat sink devices 20 includes a spring clip 50 and a balancing clip 60 (not shown).

Using the arrangement shown in FIG. 8 enables the number of optical communications systems 100 that are connected the front panel 81 to be increased, which enables the overall bandwidth of the system 200 to be increased. Because the heat dissipation portions 40 of the heat sink devices 20 are behind the respective modified cages 10 rather than on top or underneath them, the systems 100 have relatively low profiles that enable them to be stacked on a single blade 210. Increasing the number of systems 100 that can be stacked on a single blade 210 enables the overall bandwidth of a rack that contains many such blades 210 to be increased.

Figure 9:
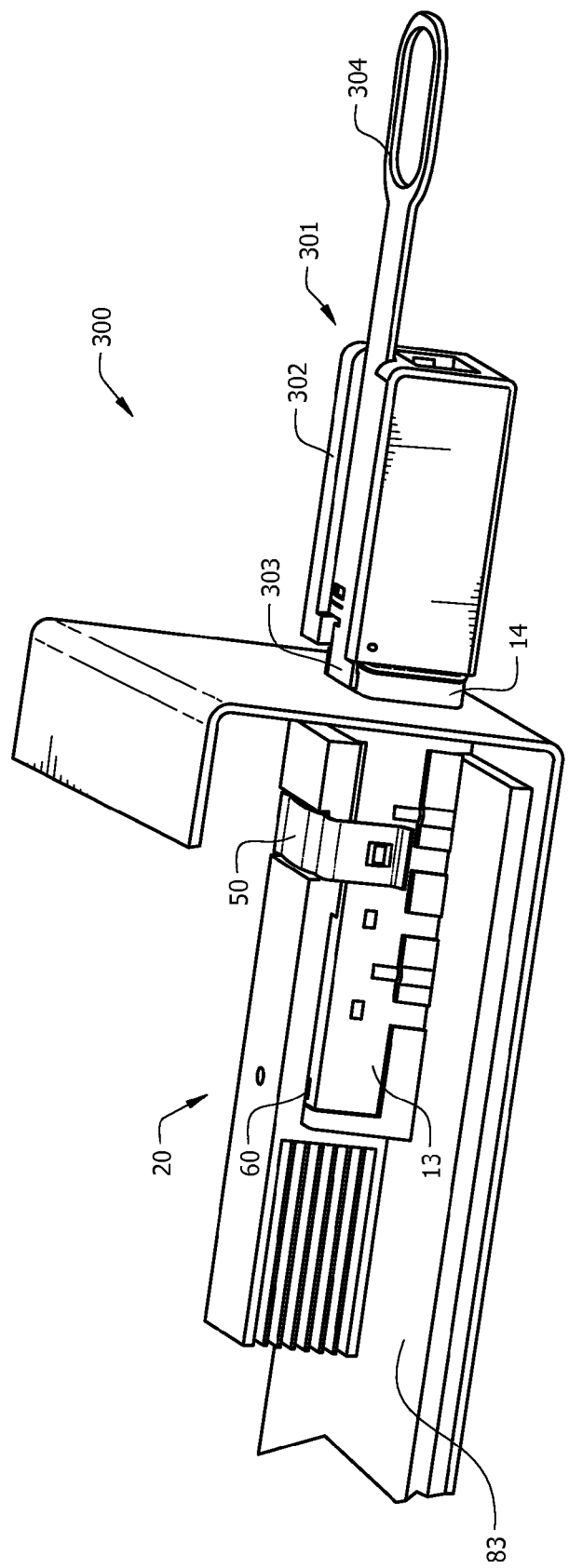
FIG. 9 illustrates a perspective side view of an optical communications system comprising the modified cage shown in FIG. 2 having the heat sink device shown in FIG. 3 secured thereto and having a parallel optical transceiver device connected to the receptacle of the modified cage.

FIG. 9 illustrates a perspective side view of an optical communications system 300 comprising the modified cage 10 shown in FIG. 2 having the heat sink device 20 shown in FIG. 3 secured thereto and having a parallel optical transceiver device 301 connected to the receptacle 14 of the modified cage 10. The optical communications system 300 shown in FIG. 9 is identical to the optical communications system 100 shown in FIG. 4 with the exception that the optical communications system 300 shown in FIG. 9 uses a parallel optical transceiver device 301 that is different from the parallel optical transceiver device 71 shown in FIG. 4. As indicated above, the invention is not limited with respect to the type of parallel optical communications device that is connected to the modified cage 10 and used with the heat sink device 20.

The modified cage 10 is secured to a front panel 81 and mounted on a PCB 83. The parallel optical transceiver device 301 has a housing 302 that houses electrical circuitry and optics (not shown) of the parallel optical transceiver device 301. When the parallel optical transceiver device 301 is plugged into the receptacle 14 of the modified cage 10, a latching mechanism 304 of a latch 303 of the housing 302 interlocks with a latching mechanism (not shown) on the receptacle 14. When the parallel optical transceiver device 301 and the receptacle 14 are locked together in this manner, the lower surface 30b (FIG. 3) of the heat transfer portion 30 (FIG. 3) of the heat sink device 20 is in contact with an upper heat transfer surface (not visible in FIG. 9) of the parallel optical transceiver device 301. As indicated above, the spring clip 50 has a spring constant that is selected to ensure that the flats corresponding to these surfaces are always in continuous contact with each other. Consequently, if there is some movement of the parallel optical transceiver device 301 within the receptacle 14, the heat transfer surface 30b of the heat sink device 20 and the heat transfer surface (not visible in FIG. 9) of the parallel optical transceiver device 301 remain in continuous contact with each other at all times. The balancing spring 60 performs the counter-balancing functions described above with reference to FIG. 7.

Figure 10:
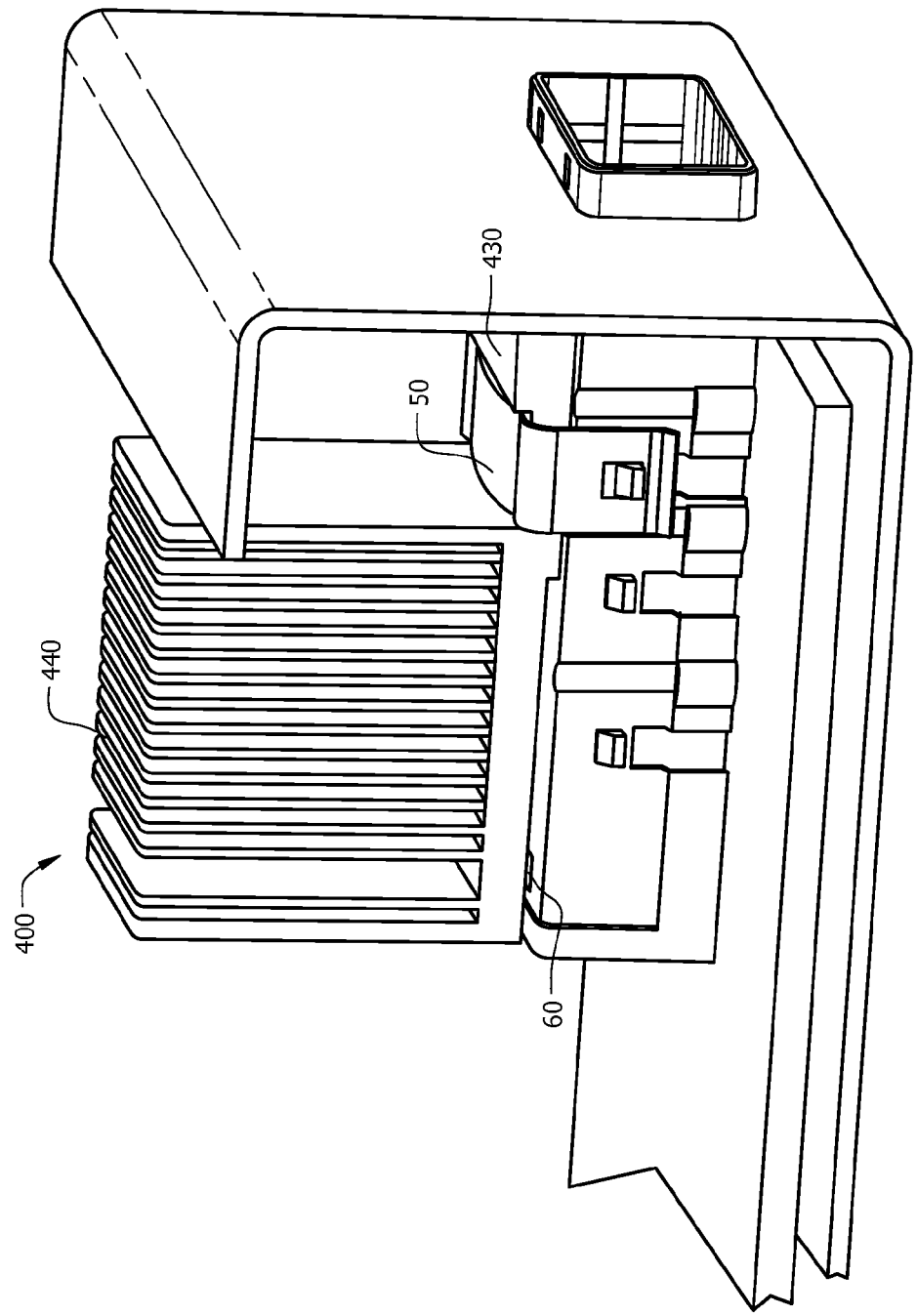
FIG. 10 illustrates a perspective side view of the floating heat sink device in accordance with another illustrative embodiment attached to the modified cage described above with reference to FIG. 2.

FIG. 10 illustrates a perspective side view of the floating heat sink device 400 in accordance with another illustrative embodiment attached to the modified cage 10 described above with reference to FIG. 2. As indicated above, the invention is not limited with respect to the configuration of the floating heat sink device. For example, although the heat dissipation portion 40 of the floating heat sink device 20 described above with reference to FIGS. 3 and 4 is positioned behind the modified cage 10 and is longitudinal in construction, the floating heat sink device 400 shown in FIG. 10 has a heat dissipation portion 440 that is transverse in construction and is positioned on top of the modified cage 10 rather than behind the modified cage 10. As with the floating heat sink device 20 described above with reference to FIGS. 3 and 4, the floating heat sink device 400 shown in FIG. 10 has a heat transfer portion 430 that is positioned on top of the modified cage 10. The spring clip 50 and the balancing spring 60 shown in FIG. 10 are identical to, and perform the same functions as, the spring clip 50 and balancing spring 60 described above with reference to FIGS. 3-9.

Figure 11:
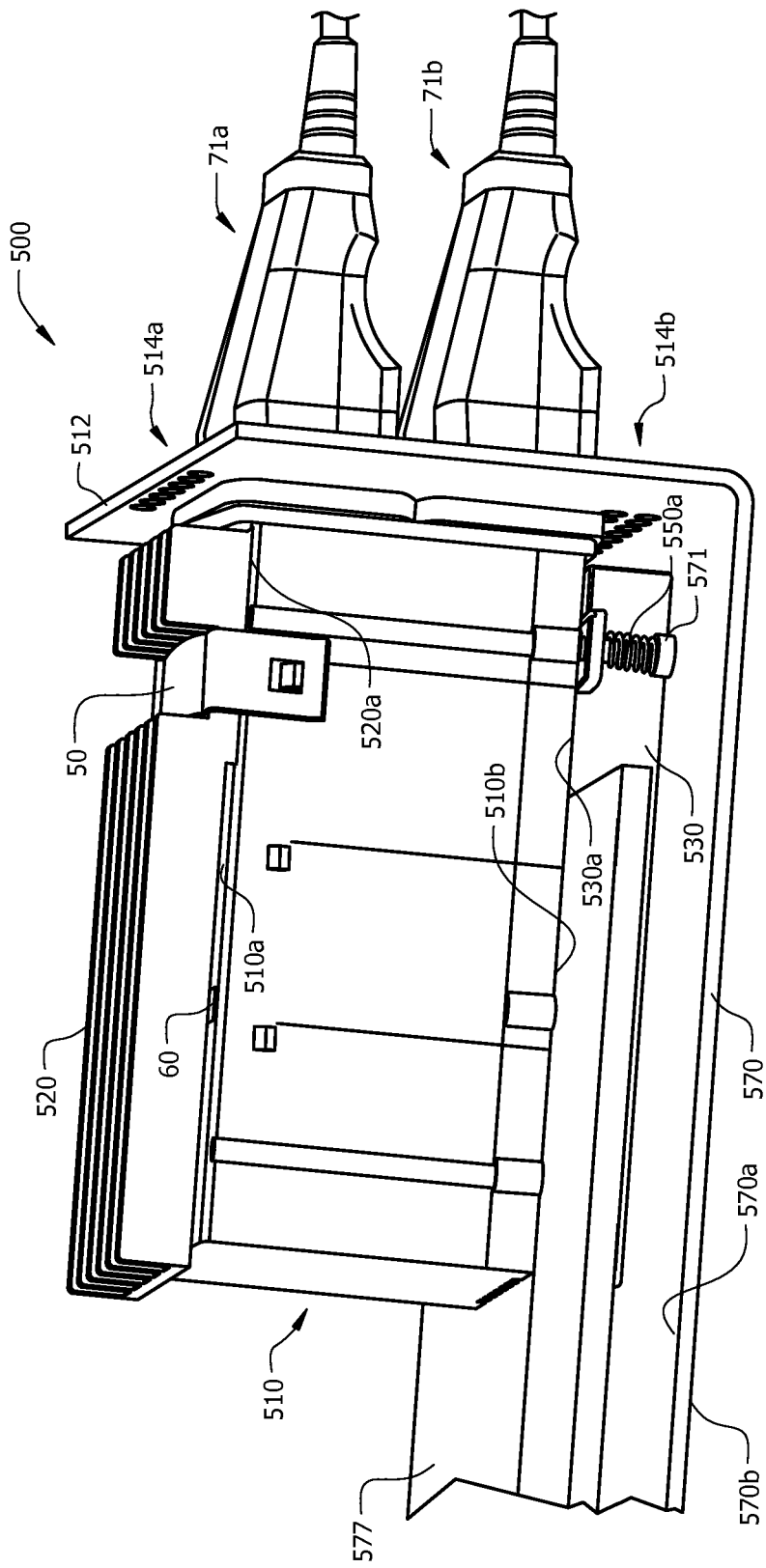
FIG. 11 illustrates a perspective side view of an optical communications system in accordance with another illustrative embodiment having a modified stacked cage.

FIG. 11 illustrates a perspective side view of an optical communications system 500 in accordance with another illustrative embodiment having a modified stacked cage 510, first and second floating heat sink devices 520 and 530 secured to the modified stacked cage 510, a front panel 512 to which the modified stacked cage 510 is secured, and two parallel optical transceiver devices 71a and 71b of the type described above with reference to FIG. 4 connected to respective receptacles 514a and 514b of the modified stacked cage 510. The modified stacked cage 510 shown in FIG. 11 is similar to the modified cage 10 shown in FIG. 2 except that the modified cage 510 shown in FIG. 11 has a height that is significantly greater than the height of the modified cage 10 shown in FIG. 2 in order to accommodate connections for two optical transceiver devices. The modified stacked cage 510 has been modified in the same manner in which the modified cage 10 described above with reference to FIG. 2 has been modified by removing a lid (not shown) from the top of the cage 510 to leave an open area in the top of the cage 510.

The first floating heat sink device 520 is secured to the top portion 510a of the modified stacked cage 510 by a spring clip 50 that is identical to the spring clip 50 described above with reference to FIGS. 3-6. The spring clip 50 performs the functions described above with reference to FIGS. 3-6. A balancing clip 60 that is identical to the balancing clip 60 described above with reference to FIGS. 4 and 7 may also be used with the floating heat sink device 520 to perform the functions described above with reference to FIGS. 4 and 7. The first floating heat sink device 520 is very similar to the floating heat sink device 20 described above except that there is no portion of the first floating heat sink device 520 that is positioned on the back of the modified stacked cage 510. Rather, the entire first floating heat sink device 520 is positioned on the top portion 510a of the modified stacked cage 510. The first floating heat sink device 520 floats in the same manner in which the floating heat sink device 20 described above with reference to FIG. 4 floats. In other words, a surface (not shown) of the parallel optical transceiver device 71a is held in abutment with the lower surface 520a of the first floating heat sink device 520 via the spring clip 50. If the parallel optical transceiver device 71a moves within the receptacle 514a, the spring clip 50 causes the first floating heat sink device 520 to float in the manner described above with reference to FIGS. 3-6 such that the two abutting surfaces are maintained in continuous contact.

Figure 12:
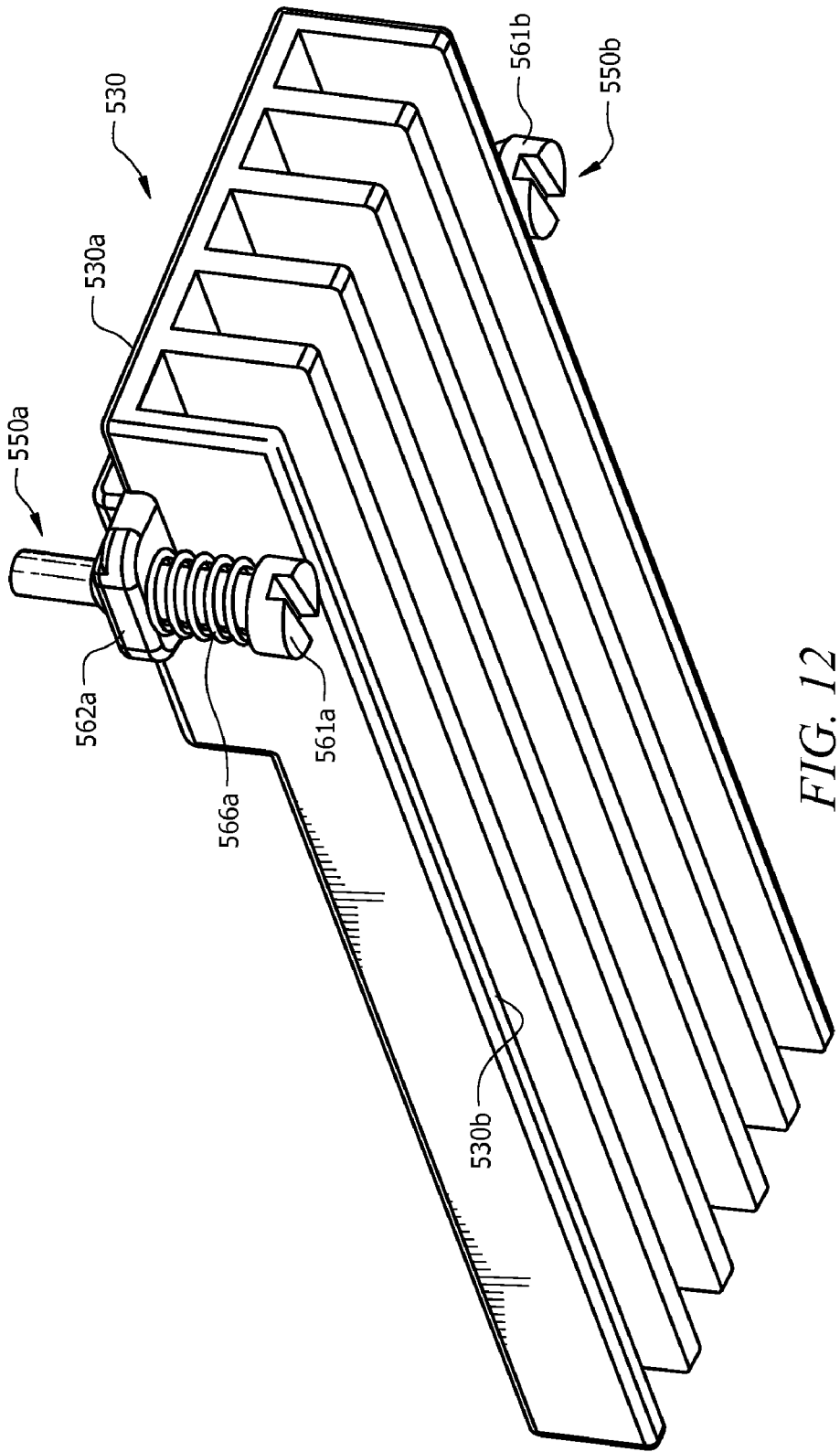
FIGS. 12 and 13 illustrate side and top perspective views, respectively, of the second floating heat sink device shown in FIG. 11.
Figure 13:
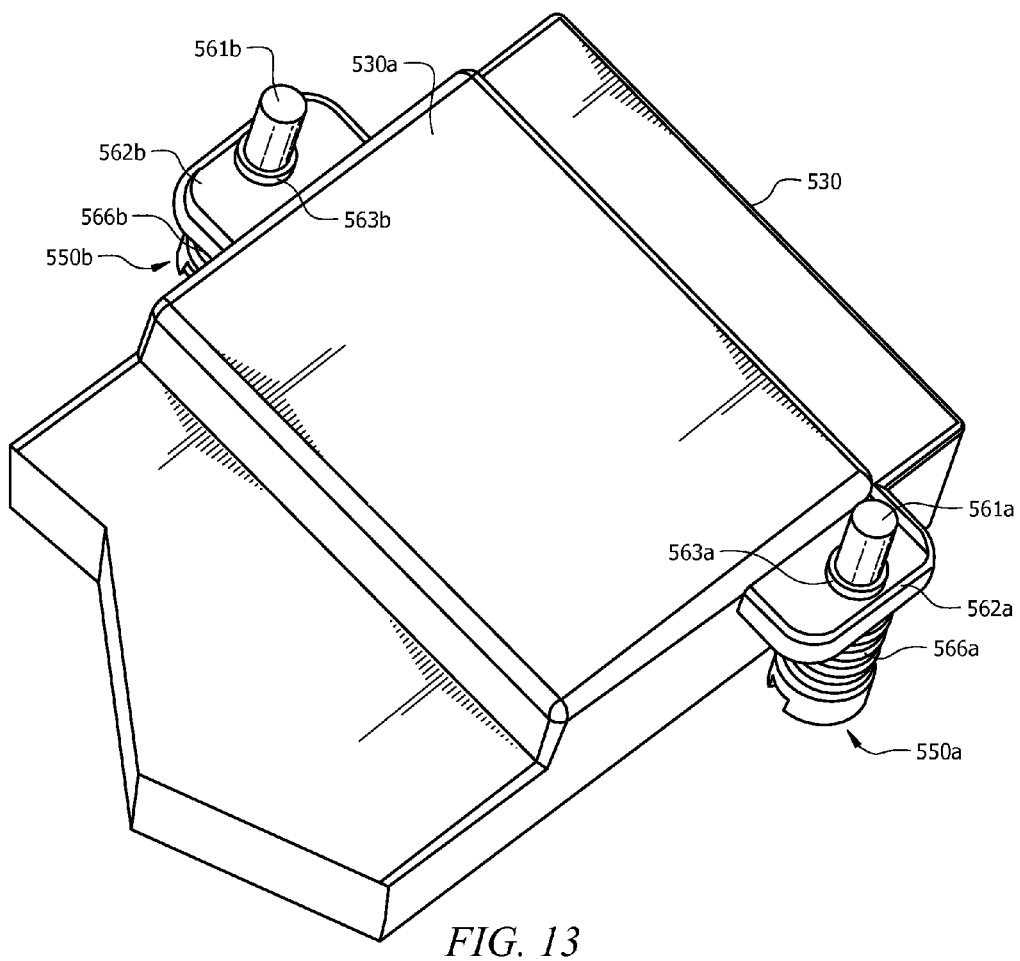

The second floating heat sink device 530 will be described with reference to FIGS. 11, 12 and 13. FIGS. 12 and 13 illustrate side and top perspective views, respectively, of the second floating heat sink device 530. The second floating heat sink device 530 (FIG. 11) is secured to a bottom portion 510b (FIG. 11) of the modified stacked cage 510 (FIG. 11) by two identical spring-and-shoulder screw configurations 550a, 550b (FIGS. 12 and 13) located on opposite sides of the second floating heat sink device 530 (FIGS. 12 and 13). The spring-and-shoulder screw configurations 550a, 550b (FIGS. 12 and 13) operate to hold the upper surface 530a (FIG. 11) of the second floating heat sink device 530 (FIG. 11) in abutment with a surface (not shown) of the parallel optical transceiver device 71b (FIG. 12). Specifically, if the parallel optical transceiver device 71b (FIG. 11) moves within the receptacle 514b, the spring-and-shoulder screw configurations 550a, 550b (FIGS. 12 and 13) located on opposite sides of the second floating heat sink device 530 (FIG. 11) allow the second floating heat sink device 530 (FIG. 11) to float such that the two abutting surfaces are maintained in continuous contact.

The lower surface 530b (FIG. 12) of the second floating heat sink device 530 (FIGS. 11, 12 and 13) is in contact with an upper surface 570a (FIG. 11) of a blade 570 (FIGS. 11) on which a PCB 577 (FIG. 11) is mounted. Openings 571 (FIG. 11) located on opposite sides of the blade 570 (FIG. 11) extend between the upper surface 570a (FIG. 11) of the blade 570 (FIG. 11) and a lower surface 570b (FIG. 11) of the blade 570 (FIG. 11). Shafts of respective threaded screws 561a and 561b (FIGS. 12 and 13) of the spring-and-shoulder screw configurations 550a, 550b(FIGS. 12 and 13) pass through the respective openings 571 (FIGS. 11) formed in blade 570 and pass through respective openings 563a and 563b (FIG. 13) formed in respective ears 562a and 562b (FIG. 13) of the second floating heat sink device 530 (FIG. 13). The threaded ends of the screws 561a, 561b (FIGS. 12 and 13) are received in respective threaded openings (not shown) formed in opposite sides of the bottom portion 510b (FIG. 11) of the modified stacked cage 510 (FIG. 11). Respective coil springs 566a and 566b (FIG. 13) are positioned between the respective openings 571 (FIG. 11) formed in the blade 570 (FIG. 11) and the respective openings 563a, 563b (FIG. 13) formed in the respective ears 562a, 562b(FIG. 13). The spring constant of the coil springs 566a, 566b (FIG. 13) is selected to ensure that the coil springs 566a, 566b (FIG. 13) bias the second floating heat sink device 530 (FIGS. 11) upwards and thereby maintain a portion of the upper surface 530a(FIGS. 11, 12 and 13) of the second floating heat sink device 530 (FIG. 11) in continuous contact with the heat transfer surface (not shown) of the parallel optical transceiver device 71b (FIG. 11).

Figure 14:
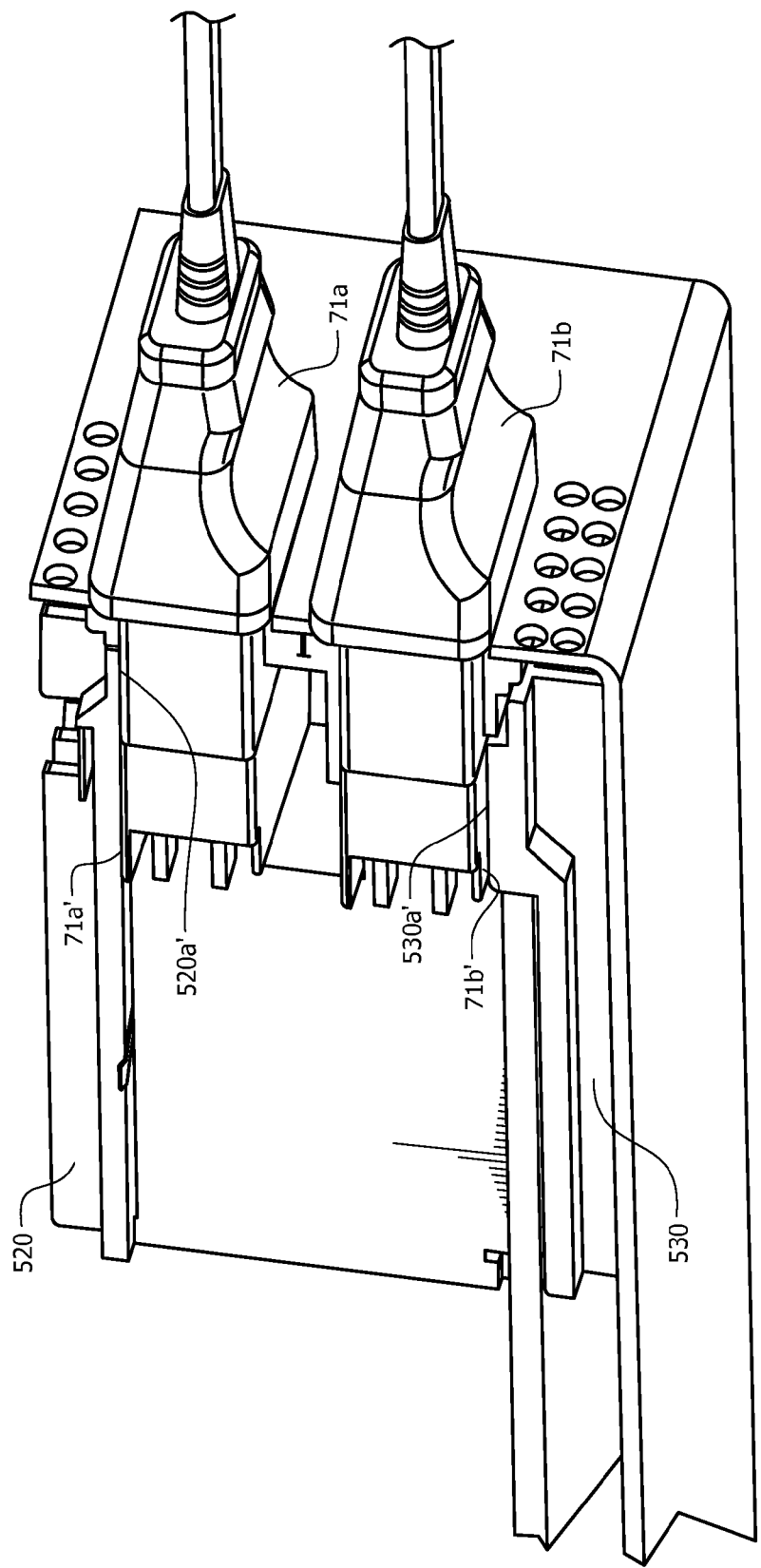
FIG. 14 illustrates a side perspective view of a cross section of the optical communications system shown in FIG. 11.

FIG. 14 illustrates a perspective side view of a cross section of the optical communications system 500 shown in FIG. 11. A cross section of the system 500 has been removed in FIG. 14 to reveal the surfaces of the parallel optical transceiver devices 71a, 71b and of the first and second floating heat sink devices 520 and 530 that are maintained in continuous contact with each other via the forces exerted by the spring clip 50 and by the spring-and-shoulder screw configurations 550. The surfaces 71a' and 71b' of the parallel optical transceiver devices 71a and 71b, respectively, are in contact with the surfaces 520a' and 530a', respectively, of the first and second floating heat sink devices 520 and 530, respectively. Due to the forces exerted on the first and second floating heat sink devices 520 and 530 by the spring clip 50 and by the spring-and-shoulder screw configurations 550a, 550b, the heat sink devices 520 and 530 will float with any movement of the parallel optical transceiver devices 71a and 71b, respectively, thereby ensuring that the respective surfaces 71a', 71b', 520a', and 530a' remain in continuous contact with each other. In this way, the first and second floating heat sink devices 520 and 530 will absorb most if not all of the heat that passes into the surfaces 71a' and 71b', respectively.

It should be noted that the invention has been described with respect to illustrative embodiments for the purpose of describing the principles and concepts of the invention. The invention is not limited to these embodiments. For example, while the invention has been described with reference to using particular configurations for the parallel optical transceiver devices and the optical communications systems in which they are used, the invention is not limited to these devices and systems that have these particular configurations. As will be understood by those skilled in the art in view of the description being provided herein, modifications may be made to the embodiments described to provide a system that achieves the goal of the invention, and all such modifications are within the scope of the invention.

What is claimed is:

1. A cage for use with a parallel optical communications device, the cage comprising:
   a cage housing having at least a front side, a back side, a top side, a bottom side, a left side and a right side, each of the top side, the bottom side, the left side and the right side having first ends that intersect with the front side and second ends that intersect with the back side, the cage housing having at least a first receptacle formed in the front side, the receptacle being configured to engage a first parallel optical communications device, and wherein the cage housing includes at least first and second mechanical coupling features;
   a first floating heat sink device having at least an upper surface and a lower surface, at least a portion of the lower surface of the first floating heat sink device being positioned against at least a portion of the top side of the cage housing, wherein the lower surface of the first floating heat sink device includes a heat transfer surface that is disposed in an opening in the top side of the cage housing; and
   a spring clip secured to the cage housing such that a portion of the spring clip is in contact with a portion of the upper surface of the first floating heat sink device, the spring clip having at least first and second mechanical coupling features, the first and second mechanical coupling features of the spring clip engaging the first and second mechanical coupling features of the cage housing, respectively, to secure the spring clip to the cage housing, and wherein the first and second mechanical coupling features of the spring clip and of the cage housing are configured to allow limited movement of the first and second mechanical coupling features of the spring clip relative to the respective first and second mechanical coupling features of the cape housing, and wherein the spring clip retains the portion of the lower surface of the first floating heat sink device in position against the portion of the top side of the cage housing while allowing at least the heat transfer surface of the first floating heat sink device to move relative to the cage housing, and wherein if a first parallel optical communications device is connected to the receptacle of the cage housing, one or more forces exerted by the spring clip act to maintain a heat transfer surface of the first parallel optical communications device in continuous contact with the heat transfer surface of the first floating heat sink device.

2. The cage of claim 1, wherein the cage housing includes at least first and second tabs located opposite each other on the left and right sides of the cage housing, and wherein the spring clip has first and second ends having first and second openings, respectively, formed therein, the first and second openings being locked to the first and second tabs, respectively, and wherein a portion of the spring clip between the first and second ends of the spring clip is in contact with the portion of the upper surface of the first floating heat sink device.

3. The cage of claim 1, wherein said at least first and second mechanical coupling features of the cage housing includes at least first and second tabs, respectively, located opposite each other on the left and right sides of the cage housing, and wherein said at least first and second mechanical coupling features of the spring clip include at least first and second openings formed in first and second ends respectively, of the spring clip, the first and second openings being locked to the first and second tabs, respectively, and wherein the first and second openings are larger that the first and second tabs, respectively, to allow limited movement of the first and second tabs within the first and second openings, respectively.

4. The cage of claim 1, wherein the lower surface of the first floating heat sink device covers most of the top side of the cage housing.

5. The cage of claim 1, further comprising a balancing spring interposed between the top side of the cage housing and the lower surface of the first floating heat sink device at a location near the back side of the cage housing, the balancing spring exerting at least one force on the first floating heat sink device generally in a direction away from the top side of the first floating heat sink device.

6. The cage of claim 5, wherein the balancing spring is fixedly secured to the lower surface of the first floating heat sink device.

7. A cage for use with a parallel optical communications device, the cage comprising:
   a cage housing having at least a front side, a back side, a top side, a bottom side, a left side and a right side, each of the top side, the bottom side, the left side and the right side having first ends that intersect with the front side and second ends that intersect with the back side, the cage housing having at least first and second receptacles formed in the front side thereof configured to engage first and second parallel optical communications devices, respectively, the first receptacle being below the second receptacle such that the first receptacle is closer to the bottom side of the cage housing than to the top side of the cage housing and such that the second receptacle is closer to the top side of the cage housing than to the bottom side of the cage housing;

a first floating heat sink device having at least an upper surface and a lower surface, at least a portion of the upper surface of the first floating heat sink device being positioned against at least a portion of the bottom side of the cage housing, wherein the upper surface of the first floating heat sink device includes a heat transfer surface that is disposed in an opening in the bottom side of the cage housing; and a spring coupling mechanism secured to the cage housing and to a blade on which the cage is mounted such that a portion of the spring coupling mechanism is in contact with a portion of the lower surface of the first floating heat sink device, wherein the spring coupling mechanism retains the portion of the upper surface of the first floating heat sink device in position against the portion of the bottom side of the cage housing while allowing at least the heat transfer surface of the first floating heat sink device to move relative to the cage housing, and wherein if a first parallel optical communications device is connected to the first receptacle of the cage housing, one or more forces exerted by the spring coupling mechanism act to maintain a heat transfer surface of the first parallel optical communications device in continuous contact with the heat transfer surface of the first floating heat sink device.

8. The cage of claim 7, further comprising:

a second floating heat sink device having at least an upper surface and a lower surface, at least a portion of the lower surface of the second floating heat sink device being positioned against at least a portion of the top side of the cage housing, wherein the lower surface of the second floating heat sink device includes a heat transfer surface that is disposed in an opening in the top side of the cage housing; and a spring clip secured to the cage housing such that a portion of the spring clip is in contact with a portion of the upper surface of the second floating heat sink device, wherein the spring clip retains the portion of the lower surface of the second floating heat sink device in position against the portion of the top side of the cage housing while allowing at least the heat transfer surface of the second floating heat sink device to move relative to the cage housing, and wherein if a second parallel optical communications device is connected to the second receptacle of the cage housing, one or more forces exerted by the spring clip act to maintain a heat transfer surface of the second parallel optical communications device in continuous contact with the heat transfer surface of the second floating heat sink device.

9. The cage of claim 7, wherein the spring coupling mechanism includes at least one spring-and-shoulder screw configuration.

10. The cage of claim 8, wherein the cage housing includes at least first and second tabs located opposite each other on the left and right sides of the cage housing, and wherein the spring clip has first and second ends having first and second openings, respectively, formed therein, the first and second openings being locked to the first and second tabs, respectively, and wherein a portion of the spring clip between the first and second ends of the spring clip is in contact with the portion of the upper surface of the second floating heat sink device.

11. The cage of claim 8, wherein the cage housing includes at least first and second tabs located opposite each other on the left and right sides of the cage housing, and wherein the spring clip has first and second ends having first and second openings, respectively, formed therein, the first and second openings being locked to the first and second tabs, respectively, and wherein the first and second openings are larger that the first and second tabs, respectively, to allow limited movement of the first and second tabs within the first and second openings, respectively.

12. The cage of claim 8, wherein the upper surface of the first floating heat sink device covers most of the bottom side of the cage housing, and wherein lower surface of the second floating heat sink device covers most of the top side of the cage housing.

13. The cage of claim 8, further comprising a balancing spring interposed between the top side of the cage housing and the lower surface of the second floating heat sink device at a location near the back side of the cage housing, the balancing spring exerting at least one force on the second floating heat sink device generally in a direction away from the top side of the second floating heat sink device.

14. The cage of claim 13, wherein the balancing spring is fixedly secured to the lower surface of the second floating heat sink device.

15. A method for dissipating heat in a cage configured to be used with at least one parallel optical communications device, the method comprising:

providing a cage housing having at least a front side, a back side, a top side, a bottom side, a left side and a right side, each of the top side, the bottom side, the left side and the right side having first ends that intersect with the front side and second ends that intersect with the back side, the cage housing having at least a first receptacle formed in the front side, the receptacle being configured to engage a first parallel optical communications device, and wherein the cage housing includes at least first and second mechanical coupling features;

providing a first floating heat sink device having at least an upper surface and a lower surface;

positioning the first floating heat sink device on the cage housing such that at least a portion of the lower surface of the first floating heat sink device being is positioned against at least a portion of the top side of the cage housing, wherein the lower surface of the first floating heat sink device includes a heat transfer surface that is disposed in an opening in the top side of the cage housing; and securing a spring clip to the cage housing such that a portion of the spring clip is in contact with a portion of the upper surface of the first floating heat sink device, the spring clip having at least first and second mechanical coupling features, the first and second mechanical coupling features of the spring clip engaging the first and second mechanical coupling features of the cage housing, respectively, to secure the spring clip to the cage housing, and wherein the first and second mechanical coupling features of the spring clip and of the cage housing are configured to allow limited movement of the first and second mechanical coupling features of the spring clip relative to the respective first and second mechanical coupling features of the cage housing, and wherein the spring clip retains the portion of the lower surface of the first floating heat sink device in position against the portion of the top side of the cage housing while allowing at least the heat transfer surface of the first floating heat sink device to move relative to the cage housing, and wherein if a first parallel optical communications device is connected to the receptacle of the cage housing, one or more forces exerted by the spring clip act to maintain a heat transfer surface of the first parallel optical communications device in continuous contact with the heat transfer surface of the first floating heat sink device.

16. The method of claim 15, wherein the cage housing includes at least first and second tabs located opposite each other on the left and right sides of the cage housing, and wherein the spring clip has first and second ends having first and second openings, respectively, formed therein, the first and second openings being locked to the first and second tabs, respectively, and wherein a portion of the spring clip between the first and second ends of the spring clip is in contact with the portion of the upper surface of the first floating heat sink device.

17. The method of claim 15, wherein said at least first and second mechanical coupling features of the cage housing includes at least first and second tabs located opposite each other on the left and right sides of the cage housing, and wherein said at least first and second mechanical coupling features of the spring clip include at least first and second openings formed in first and second ends of the spring clip, respectively, the first and second openings being locked to the first and second tabs, respectively, and wherein the first and second openings are larger that the first and second tabs, respectively, to allow limited movement of the first and second tabs within the first and second openings, respectively.

18. The method of claim 15, wherein the lower surface of the first floating heat sink device covers most of the top side of the cage housing.

19. The method of claim 15, further comprising:
  interposing a balancing spring between the top side of the cage housing and the lower surface of the first floating heat sink device at a location near the back side of the cage housing, the balancing spring exerting at least one force on the first floating heat sink device generally in a direction away from the top side of the first floating heat sink device.

20. The method of claim 19, wherein the balancing spring is fixedly secured to the lower surface of the first floating heat sink device.

21. A method for dissipating heat in a cage configured to be used with at least one parallel optical communications device, the method comprising:
  providing a cage housing having at least a front side, a back side, a top side, a bottom side, a left side and a right side, each of the top side, the bottom side, the left side and the right side having first ends that intersect with the front side and second ends that intersect with the back side, the cage housing having at least first and second receptacles formed in the front side thereof configured to engage first and second parallel optical communications devices, respectively, the first receptacle being below the second receptacle such that the first receptacle is closer to the bottom side of the cage housing than to the top side of the cage housing and such that the second receptacle is closer to the top side of the cage housing than to the bottom side of the cage housing;
  providing a first floating heat sink device having at least an upper surface and a lower surface;
  positioning the first floating heat sink device on the cage housing such that at least a portion of the upper surface of the first floating heat sink device is positioned against at least a portion of the bottom side of the cage housing, wherein the upper surface of the first floating heat sink device includes a heat transfer surface that is disposed in an opening in the bottom side of the cage housing; and
  securing a spring coupling mechanism to the cage housing and to a blade on which the cage is mounted such that a portion of the spring coupling mechanism is in contact with a portion of the lower surface of the first floating heat sink device, wherein the spring coupling mechanism retains the portion of the upper surface of the first floating heat sink device in position against the portion of the bottom side of the cage housing while allowing at least the heat transfer surface of the first floating heat sink device to move relative to the cage housing, and wherein if a first parallel optical communications device is connected to the first receptacle of the cage housing, one or more forces exerted by the spring coupling mechanism act to maintain a heat transfer surface of the first parallel optical communications device in continuous contact with the heat transfer surface of the first floating heat sink device.

22. The method of claim 21, further comprising:
  providing a second floating heat sink device having at least an upper surface and a lower surface;
  positioning the second floating heat sink device on the cage housing such that at least a portion of the lower surface of the second floating heat sink device is positioned against at least a portion of the top side of the cage housing, wherein the lower surface of the second floating heat sink device includes a heat transfer surface that is disposed in an opening in the top side of the cage housing; and
  securing a spring clip to the cage housing such that a portion of the spring clip is in contact with a portion of the upper surface of the second floating heat sink device, wherein the spring clip retains the portion of the lower surface of the second floating heat sink device in position against the portion of the top side of the cage housing while allowing at least the heat transfer surface of the second floating heat sink device to move relative to the cage housing, and wherein if a second parallel optical communications device is connected to the second receptacle of the cage housing, one or more forces exerted by the spring clip act to maintain a heat transfer surface of the second parallel optical communications device in continuous contact with the heat transfer surface of the second floating heat sink device.

* * * * *